US012199995B2

(12) United States Patent
Jiang et al.

(10) Patent No.: US 12,199,995 B2
(45) Date of Patent: Jan. 14, 2025

(54) SYSTEM AND METHOD FOR AUTHENTICATION CODE GENERATION BASED ON ADVERSARIAL MACHINE LEARNING

(71) Applicant: Zhejiang Gongshang University, Hangzhou (CN)

(72) Inventors: Xiaoning Jiang, Hangzhou (CN); Jianan Qi, Hangzhou (CN); Jian Fang, Hangzhou (CN); Yuhan Zhou, Hangzhou (CN); Hongmin Xie, Hangzhou (CN); Hanqi Liu, Hangzhou (CN); Zhenye Xu, Hangzhou (CN)

(73) Assignee: Zhejiang Gongshang University, Hangzhou (CN)

( * ) Notice: Subject to any disclaimer, the term of this patent is extended or adjusted under 35 U.S.C. 154(b) by 278 days.

(21) Appl. No.: 18/087,557

(22) Filed: Dec. 22, 2022

(65) Prior Publication Data

US 2024/0106841 A1 Mar. 28, 2024

(30) Foreign Application Priority Data

Sep. 23, 2022 (CN) .......................... 202211167359.9

(51) Int. Cl.
*H04L 9/40* (2022.01)
*H04L 41/16* (2022.01)

(52) U.S. Cl.
CPC .......... *H04L 63/1416* (2013.01); *H04L 41/16* (2013.01); *H04L 63/1466* (2013.01)

(58) Field of Classification Search
CPC .... H04L 63/1416; H04L 41/16; H04L 63/146
See application file for complete search history.

(56) References Cited

U.S. PATENT DOCUMENTS

| 10,462,170 | B1* | 10/2019 | Wang | H04L 63/1416 |
|---|---|---|---|---|
| 11,336,683 | B2* | 5/2022 | Gorrepati | H04L 63/1416 |
| 11,354,602 | B2* | 6/2022 | Kursun | H04L 63/1433 |
| 11,409,865 | B1* | 8/2022 | Kliger | G06F 21/64 |
| 11,551,137 | B1* | 1/2023 | Echauz | G06F 21/554 |
| 11,552,968 | B2* | 1/2023 | Clayton | H04L 63/1425 |
| 11,570,209 | B2* | 1/2023 | Crabtree | H04L 63/1416 |
| 11,582,256 | B2* | 2/2023 | Moskovich | H04L 63/20 |

(Continued)

*Primary Examiner* — Viral S Lakhia
(74) *Attorney, Agent, or Firm* — Schwegman Lundberg & Woessner, P.A.

(57) ABSTRACT

A system and method for authentication code generation based on adversarial machine learning are provided in this disclosure. The method includes a defensive authentication code generation system, an authentication code formation module, an authentication code scheduling module, an authentication-code adversarial processing center, an attack sample generation module, a verification and error reporting system, a division module, a grouping and distribution system, a category checking module, a data recording unit, a detection module and an integration terminal. In the system and method for authentication code generation based on adversarial machine learning according to the disclosure, attack scenes are simulated for continuous training for the authentication code, error-reporting data are recorded and optimized into the defensive authentication code generation system, so as to improve defense performance of the authentication code.

6 Claims, 1 Drawing Sheet

(56) References Cited

U.S. PATENT DOCUMENTS

| | | | |
|---|---|---|---|
| 11,822,651 B2* | 11/2023 | Homayoun | G06F 21/566 |
| 11,880,464 B2* | 1/2024 | Yan | G06N 3/0475 |
| 11,936,664 B2* | 3/2024 | Numainville | H04L 61/251 |
| 2022/0198790 A1* | 6/2022 | Li | G06V 10/28 |
| 2022/0311656 A1* | 9/2022 | Vaishnavi | H04L 41/0813 |
| 2023/0148116 A1* | 5/2023 | Stokes, III | G06F 21/552 |
| | | | 726/23 |
| 2023/0185912 A1* | 6/2023 | Sinn | G06F 21/56 |
| | | | 726/23 |
| 2023/0269263 A1* | 8/2023 | Yarabolu | G06F 18/2155 |
| | | | 726/22 |

\* cited by examiner

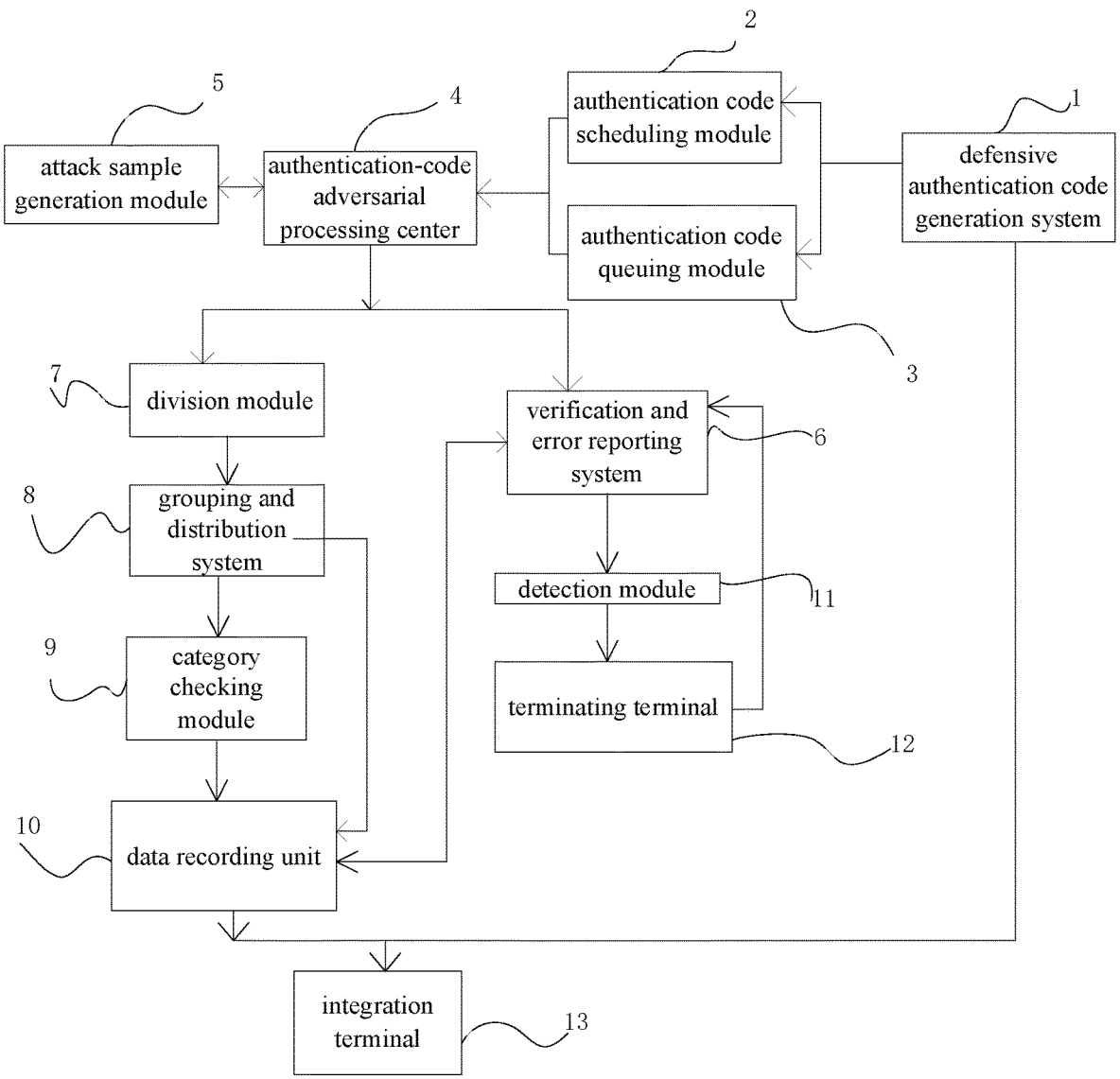

SYSTEM AND METHOD FOR AUTHENTICATION CODE GENERATION BASED ON ADVERSARIAL MACHINE LEARNING

CLAIM OF PRIORITY

This application claims the benefit of priority under 35 U.S.C. § 119 to Chinese Patent Application Serial No. 202211167359.9, filed on Sep. 23, 2022, which is incorporated by reference herein in its entirety.

TECHNICAL FIELD

The disclosure relates to a system and a method for authentication code generation based on adversarial machine learning.

BACKGROUND ART

With progress of the times, security and identifiability of existing authentication codes are getting worse and worse. With continuous access verification to a domain names from some external devices, a website is prone to crashing and defensiveness of an authentication code is increasingly getting weaker. It is urgent to provide a system and method for authentication code generation that can improve the defensiveness of the authentication code.

SUMMARY

A system and method for authentication code generation based on adversarial machine learning are provided in this disclosure so as to solve technical problems mentioned above, which specifically adopt following technical schemes.

A system for authentication code generation based on adversarial machine learning includes a defensive authentication code generation system, an authentication code formation module, an authentication code scheduling module, an authentication-code adversarial processing center, an attack sample generation module, a verification and error reporting system, a division module, a grouping and distribution system, a category checking module, a data recording unit, a detection module and an integration terminal.

The defensive authentication code generation system is configured to generate and send several defensive authentication codes in multiple categories to the authentication code formation module.

The authentication code formation module is configured to queue and sort several defensive authentication codes.

The authentication code scheduling module is configured to send the several defensive authentication codes to the authentication-code adversarial processing center according to sorting by the authentication code formation module.

The authentication-code adversarial processing center is configured to send the several defensive authentication codes subjected to continuous training to the attack sample generation module.

The attack sample generation module is configured to generate corresponding aggressive authentication codes respectively for the several defensive authentication codes received and return them to the authentication-code adversarial processing center.

The authentication-code adversarial processing center is configured to form a defensive authentication code and an aggressive authentication code corresponding to each other into an authentication code pair, send an aggressive authentication code in a matched authentication code pair to the verification and error reporting system, and send an aggressive authentication code in an unmatched authentication code pair to the division module.

The division module is configured to send received aggressive authentication codes to the grouping and distribution system.

The grouping and distribution system is configured to group the received aggressive authentication codes by categories and send them to the category checking module.

The category checking module is configured to identify the aggressive authentication codes by means of machine attacks and manually respectively, and transmit an aggressive authentication code that cannot be identified by means of the machine attacks but can be identified manually to the data recording unit.

The data recording unit is configured to send the received aggressive authentication code to the verification and error reporting system.

The verification and error reporting system is configured to count and send all of aggressive authentication codes received from the authentication-code adversarial processing center and the data recording unit to the detection module.

The detection module is configured to identify each of aggressive authentication codes by means of the machine attacks, and return aggressive authentication codes that cannot be identified to the verification and error reporting system.

The verification and error reporting system is configured to send the aggressive authentication codes returned by the detection module to the data recording unit.

The data recording unit is configured to record and then send the aggressive authentication codes returned from the verification and error reporting system to the integration terminal.

The integration terminal is configured to save the received aggressive authentication codes.

Further, the detection module is configured to identify each of the aggressive authentication codes for a preset number of times by means of the machine attacks, and return aggressive authentication codes that cannot be identified for each of the preset number of times to the verification and error reporting system.

Further, the system for authentication code generation based on adversarial machine learning further includes a terminating terminal.

The verification and error reporting system is further configured to make comparative counting so as to count a number of returned aggressive authentication codes for each of the categories after the aggressive authentication codes returned from the detection module are received.

The terminating terminal is configured to control the attack sample generation module to stop generating aggressive authentication codes for a corresponding category when a number of aggressive authentication codes for the corresponding category reaches a preset value.

Further, the terminating terminal is further configured to send a remark message to the verification and error reporting system after the attack sample generation module is controlled to stop generating the aggressive authentication code of this category.

The verification and error reporting system is configured to send the remark information to the data recording unit.

The data recording unit is configured to send the remark information to the integration terminal.

Further, an authentication code generated by the defensive authentication code generation system includes at least two of a graphic authentication code, a short-message authentication code, a voice authentication code and a video authentication code.

Further, the authentication code generated by the defensive authentication code generation system includes the graphic authentication code, the short message authentication code, the voice authentication code and the video authentication code.

A method for authentication code generation based on adversarial machine learning, which is used in the system for authentication code generation based on adversarial machine learning, includes following steps:

generating and sending several defensive authentication codes in multiple categories to an authentication code formation module by a defensive authentication code generation system;

queuing and sorting several defensive authentication codes by the authentication code formation module;

sending the several defensive authentication codes to an authentication-code adversarial processing center according to sorting by the authentication code formation module, by an authentication code scheduling module;

sending the several defensive authentication codes subjected to continuous training to an attack sample generation module by the authentication-code adversarial processing center;

generating corresponding aggressive authentication codes respectively for the several defensive authentication codes received and returning them to the authentication-code adversarial processing center, by the attack sample generation module;

forming a defensive authentication code and an aggressive authentication code corresponding to each other into an authentication code pair, sending an aggressive authentication code in a matched authentication code pair to a verification and error reporting system, and sending an aggressive authentication code in an unmatched authentication code pair to a division module, by the authentication-code adversarial processing center;

sending received aggressive authentication codes to a grouping and distribution system by the division module;

grouping the received aggressive authentication codes by categories and sending them to a category checking module by the grouping and distribution system;

identifying the aggressive authentication codes by means of machine attacks and manually respectively, and transmitting an aggressive authentication code that cannot be identified by means of the machine attacks but can be identified manually to a data recording unit, by the category checking module;

sending the received aggressive authentication code to the verification and error reporting system by the data recording unit;

counting and sending all of aggressive authentication codes received from the authentication-code adversarial processing center and the data recording unit to a detection module by the verification and error reporting system;

identifying each of the aggressive authentication codes by means of the machine attacks and returning aggressive authentication codes that cannot be identified to the verification and error reporting system, by the detection module;

sending the aggressive authentication codes returned by the detection module to the data recording unit by the verification and error reporting system;

recording and then sending the aggressive authentication codes returned from the verification and error reporting system to an integration terminal by the data recording unit; and saving the received aggressive authentication codes by the integration terminal.

Further, identifying each of the aggressive authentication codes by means of the machine attacks and returning aggressive authentication codes that cannot be identified to the verification and error reporting system, by the detection module is specifically as follows:

identifying each of the aggressive authentication codes for a preset number of times by means of the machine attacks and returning aggressive authentication codes that cannot be identified for each of the preset number of times to the verification and error reporting system, by the detection module.

Further, the method for authentication code generation based on adversarial machine learning further includes:

making comparative counting so as to count a number of returned aggressive authentication codes for each of the categories by the verification and error reporting system after the aggressive authentication codes returned from the detection module are received; and controlling the attack sample generation module to stop generating aggressive authentication codes for a corresponding category when a number of aggressive authentication codes for the corresponding category reaches a preset value, by the terminating terminal.

Further, the method for authentication code generation based on adversarial machine learning further includes:

sending a remark message to the verification and error reporting system by the terminating terminal after the attack sample generation module is controlled to stop generating the aggressive authentication code of this category;

sending the remark information to the data recording unit by the verification and error reporting system; and sending the remark information to the integration terminal by the data recording unit.

The system and method for authentication code generation based on adversarial machine learning according to the disclosure have advantages that attack scenes are simulated for continuous training for the authentication code, error-reporting data are recorded and optimized into the defensive authentication code generation system, so as to improve defense performance of the authentication code.

The system and method for authentication code generation based on adversarial machine learning according to the disclosure have advantages that in order to ensure security of adversarial equipment in adversarial learning, the terminating terminal is provided, and when the number of aggressive authentication codes for a corresponding category reaches the preset value, the terminating terminal is started to control the attack sample generation module to stop generating the aggressive authentication codes for this category.

BRIEF DESCRIPTION OF THE DRAWINGS

FIG. 1 is a schematic diagram of a system for authentication code generation based on adversarial machine learning according to the present disclosure;

Defensive Authentication Code Generation System 1, Authentication Code Scheduling Module 2, Authentication Code Formation Module 3, Authentication-code Adversarial Processing Center 4, Attack Sample Generation Module 5, Verification and Error Reporting System 6, Division Module 7, Grouping and Distribution System 8, Category Checking Module 9, Data Recording Unit 10, Detection Module 11, Terminating terminal 12 and Integration Terminal 13.

DETAILED DESCRIPTION

The disclosure will be described in the following in detail with reference to the drawings and specific embodiments.

FIG. 1 shows a system for authentication code generation based on adversarial machine learning in this disclosure, for improving defense performance of a generated authentication code. It mainly includes a defensive authentication code generation system 1, an authentication code formation module or an authentication code queuing module 3, an authentication code scheduling module 2, an authentication-code adversarial processing center 4, an attack sample generation module 5, a verification and error reporting system 6, a division module 7, a grouping and distribution system 8, a category checking module 9, a data recording unit 10, a detection module 11 and an integration terminal 13.

Specifically, the system for authentication code generation based on adversarial machine learning is operated as follows.

The defensive authentication code generation system 1 is configured to generate and send several defensive authentication codes in multiple categories to the authentication code formation module 3. It can be understood that an authentication code generated by the defensive authentication code generation system 1 includes at least two of a graphic authentication code, a short-message authentication code, a voice authentication code and a video authentication code. In this disclosure, the authentication code generated by the defensive authentication code generation system 1 includes the graphic authentication code, the short message authentication code, the voice authentication code and the video authentication code.

The authentication code formation module 3 is configured to queue and sort several defensive authentication codes. The authentication code scheduling module 2 is configured to send the several defensive authentication codes to the authentication-code adversarial processing center 4 according to sorting by the authentication code formation module 3.

The authentication-code adversarial processing center 4 is configured to send the several defensive authentication codes subjected to continuous training to the attack sample generation module 5. The attack sample generation module 5 is configured to generate corresponding aggressive authentication codes respectively for the several defensive authentication codes received and return them to the authentication-code adversarial processing center 4. The authentication-code adversarial processing center 4 is configured to form a defensive authentication code and an aggressive authentication code corresponding to each other into an authentication code pair, send an aggressive authentication code in a matched authentication code pair to the verification and error reporting system 6, and send an aggressive authentication code in an unmatched authentication code pair to the division module 7. In this application, an expression "matched" means that similarity between them reaches a preset value, and an expression "unmatched" means that the similarity between them does not reach the preset value. The preset value can be set according to actual situations.

The division module 7 is configured to send received aggressive authentication codes to the grouping and distribution system 8. The grouping and distribution system 8 is configured to group the received aggressive authentication codes by categories and send them to the category checking module 9. The category checking module 9 is configured to identify the aggressive authentication codes by means of machine attacks and manually respectively, and transmit an aggressive authentication code that cannot be identified by means of the machine attacks but can be identified manually to the data recording unit 10. In this disclosure, an expression "the category checking module 9 is configured to identify the aggressive authentication codes by means of machine attacks and manually respectively" means that the category checking module 9 is configured to identify these aggressive authentication codes by simulating two ways. One is to simulate the machine attacks, and the other is to simulate real-person identification. The graphic authentication code is taken as an example to illustrate the authentication code. The graphic authentication code is identified by simulating the machine attacks means content of the graphic authentication code is identified by a neural network or some machine recognition algorithms. Simulating real-person identification of the authentication code means that the content in this graphic authentication code is identified by simulating real person's eyes using an image-recognition method. For different types of authentication codes, the category checking module 9 is configured to simulate two identification methods by different technologies.

The data recording unit 10 is configured to send the received aggressive authentication code to the verification and error reporting system 6. The verification and error reporting system 6 is configured to count and send all of aggressive authentication codes received from the authentication-code adversarial processing center 4 and the data recording unit 10 to the detection module 11.

The detection module 11 is configured to identify each of aggressive authentication codes by means of the machine attacks, and return aggressive authentication codes that cannot be identified to the verification and error reporting system 6. The detection module 11 is configured to identify each of the aggressive authentication codes for a preset number of times by means of the machine attacks, and return aggressive authentication codes that cannot be identified for each of the preset number of times to the verification and error reporting system 6. In this way, after several rounds of screening, authentication codes finally retained has optimal anti-machine attack performance.

The verification and error reporting system 6 is configured to send the aggressive authentication codes returned by the detection module 11 to the data recording unit 10. The data recording unit 10 is configured to record and then send the aggressive authentication codes returned from the verification and error reporting system 6 to the integration terminal 13. The integration terminal 13 is configured to save the received aggressive authentication codes.

As a preferred embodiment, the system for authentication code generation based on adversarial machine learning further includes a terminating terminal 12. The verification and error reporting system 6 is further configured to make comparative counting so as to count a number of returned aggressive authentication codes for each of the categories after the aggressive authentication codes returned from the detection module 11 are received. The terminating terminal 12 is configured to control the attack sample generation module 5 to stop generating aggressive authentication codes for a corresponding category when a number of aggressive authentication codes for the corresponding category reaches a preset value. In this way, when a number of authentication codes for a certain type retained by screening reaches the preset value, no aggressive authentication code will be generated for this type of defensive authentication codes.

After that, the terminating terminal 12 is further configured to send a remark message to the verification and error reporting system 6 after the attack sample generation module 5 is controlled to stop generating the aggressive authentication code of this category. The verification and error reporting system 6 is configured to send the remark information to the data recording unit 10. The data recording unit 10 is configured to send the remark information to the integration terminal 13 for storage, facilitating checking and comparing by a person.

A method for authentication code generation based on adversarial machine learning, which is used in the system for authentication code generation based on adversarial machine learning, is further provided in this disclosure. The method for authentication code generation based on adversarial machine learning includes:

1) generating and sending several defensive authentication codes in multiple categories to an authentication code formation module 3 by a defensive authentication code generation system 1;
2) queuing and sorting several defensive authentication codes by the authentication code formation module 3;
3) sending the several defensive authentication codes to an authentication-code adversarial processing center 4 according to sorting by the authentication code formation module 3, by an authentication code scheduling module 2;
4) sending the several defensive authentication codes subjected to continuous training to an attack sample generation module 5 by the authentication-code adversarial processing center 4;
5) generating corresponding aggressive authentication codes respectively for the several defensive authentication codes received and returning them to the authentication-code adversarial processing center 4, by the attack sample generation module 5;
6) forming a defensive authentication code and an aggressive authentication code corresponding to each other into an authentication code pair, sending an aggressive authentication code in a matched authentication code pair to a verification and error reporting system 6, and sending an aggressive authentication code in an unmatched authentication code pair to a division module 7, by the authentication-code adversarial processing center 4;
7) sending received aggressive authentication codes to a grouping and distribution system 8 by the division module 7;
8) grouping the received aggressive authentication codes by categories and sending them to a category checking module 9 by the grouping and distribution system 8;
9) identifying the aggressive authentication codes by means of machine attacks and manually respectively, and transmitting an aggressive authentication code that cannot be identified by means of the machine attacks but can be identified manually to a data recording unit 10, by the category checking module 9;
10) sending the received aggressive authentication code to the verification and error reporting system 6 by the data recording unit 10;
11) counting and sending all of aggressive authentication codes received from the authentication-code adversarial processing center 4 and the data recording unit 10 to a detection module 11 by the verification and error reporting system 6;
12) identifying each of the aggressive authentication codes by means of the machine attacks and returning aggressive authentication codes that cannot be identified to the verification and error reporting system 6, by the detection module 11;
13) sending the aggressive authentication codes returned by the detection module 11 to the data recording unit 10 by the verification and error reporting system 6;
14) recording and then sending the aggressive authentication codes returned from the verification and error reporting system 6 to an integration terminal 13 by the data recording unit 10; and
15) saving the received aggressive authentication codes by the integration terminal 13.

Preferably, identifying each of the aggressive authentication codes by means of the machine attacks and returning aggressive authentication codes that cannot be identified to the verification and error reporting system 6, by the detection module 11 is specifically as follows:

identifying each of the aggressive authentication codes for a preset number of times by means of the machine attacks and returning aggressive authentication codes that cannot be identified for each of the preset number of times to the verification and error reporting system 6, by the detection module 11.

Preferably, the method for authentication code generation based on adversarial machine learning further includes:

making comparative counting so as to count a number of returned aggressive authentication codes for each of the categories by the verification and error reporting system 6 after the aggressive authentication codes returned from the detection module 11 are received; and
controlling the attack sample generation module 5 to stop generating aggressive authentication codes for a corresponding category when a number of aggressive authentication codes for the corresponding category reaches a preset value, by the terminating terminal 12.

Preferably, the method for authentication code generation based on adversarial machine learning further includes:

sending a remark message to the verification and error reporting system 6 by the terminating terminal 12 after the attack sample generation module 5 is controlled to stop generating the aggressive authentication code of this category;
sending the remark information to the data recording unit 10 by the verification and error reporting system 6; and
sending the remark information to the integration terminal 13 by the data recording unit 10.

For some technical details of the authentication code generation method based on adversarial machine learning, reference is made to the system for authentication code generation based on adversarial machine learning, which will not be repeatedly described here again.

The basic principles, main features and advantages of the present disclosure are shown and described in the above. It should be understood by those skilled in the industry that the above embodiments do not limit the present disclosure in any form, and all technical solutions obtained by equivalent substitution or equivalent transformation fall within the protection scope of the present disclosure.

The claims are as follows:

1. A method for authentication code generation based on adversarial machine learning, comprising:
   generating several defensive authentication codes in multiple categories;
   queuing and sorting the several defensive authentication codes;
   sending the several defensive authentication codes according to the queuing and sorting to be continuous trained;
   generating corresponding aggressive authentication codes respectively for the several defensive authentication codes after the continuous training;
   forming a defensive authentication code and an aggressive authentication code corresponding to each other into an authentication code pair, sending an aggressive authentication code in a matched authentication code pair for verification and error reporting, and sending an aggressive authentication code in an unmatched authentication code pair to divide;
   grouping and category checking, sequentially, the aggressive authentication code that need to be divided;
   the category checking comprising identifying the aggressive authentication codes by means of machine attacks and manually respectively, and transmitting an aggressive authentication code that cannot be identified by means of the machine attacks but can be identified manually to verify and error report;
   detecting all of aggressive authentication codes that to verify and error report;
      the detecting comprising identifying each of aggressive authentication codes by means of the machine attacks, returning the aggressive authentication codes that cannot be identified for verification and error reporting again, wherein the detecting comprises identifying each of the aggressive authentication codes for a preset number of times by means of the machine attacks, and return aggressive authentication codes that cannot be identified for each of the preset number of times to for verification and error reporting again;
   making comparative counting so as to count a number of returned aggressive authentication codes for each of the categories after the aggressive authentication codes returned from the detecting;
   stopping generating aggressive authentication codes for a corresponding category when a number of aggressive authentication codes for the corresponding category reaches a preset value; and
   saving the aggressive authentication codes after detecting.

2. The method for authentication code generation based on adversarial machine learning according to claim 1, wherein the method further comprises:
   sending a remark message for verification and error reporting after stopping generating the aggressive authentication code of this category;
   recording and saving the remark message.

3. The method for authentication code generation based on adversarial machine learning according to claim 1, wherein
   the authentication code comprises at least two of a graphic authentication code, a short-message authentication code, a voice authentication code and a video authentication code.

4. The method for authentication code generation based on adversarial machine learning according to claim 3, wherein
   the authentication code comprises the graphic authentication code, the short message authentication code, the voice authentication code and the video authentication code.

5. A system for authentication code generation based on adversarial machine learning, comprising:
   at least one hardware processor; and
   a non-transitory memory comprising instructions to cause the at least one processor to execute a method the method comprising:
      generating several defensive authentication codes in multiple categories;
      queuing and sorting the several defensive authentication codes;
      sending the several defensive authentication codes according to the queuing and sorting to be continuous trained;
      generating corresponding aggressive authentication codes respectively for the several defensive authentication codes after the continuous training;
      forming a defensive authentication code and an aggressive authentication code corresponding to each other into an authentication code pair, sending an aggressive authentication code in a matched authentication code pair for verification and error reporting, and sending an aggressive authentication code in an unmatched authentication code pair to divide;
      grouping and category checking, sequentially, the aggressive authentication code that need to be divided;
      the category checking comprising identifying the aggressive authentication codes by means of machine attacks and manually respectively, and transmitting an aggressive authentication code that cannot be identified by means of the machine attacks but can be identified manually to verify and error report;
      detecting all of aggressive authentication codes that to verify and error report;
      the detecting comprising identifying each of aggressive authentication codes by means of the machine attacks, returning the aggressive authentication codes that cannot be identified for verification and error reporting again, wherein the detecting comprises identifying each of the aggressive authentication codes for a preset number of times by means of the machine attacks, and return aggressive authentication codes that cannot be identified for each of the preset number of times to for verification and error reporting again;
      making comparative counting so as to count a number of returned aggressive authentication codes for each of the categories after the aggressive authentication codes returned from the detecting;
      stopping generating aggressive authentication codes for a corresponding category when a number of aggressive authentication codes for the corresponding category reaches a preset value;
      and
      saving the aggressive authentication codes after detecting.

6. The system for authentication code generation based on adversarial machine learning according to claim 5, wherein the method further comprises:

sending a remark message for verification and error reporting after stopping generating the aggressive authentication code of this category;

recording and saving the remark message.

* * * * *